UNITED STATES PATENT OFFICE.

HANS M. OLSON, OF LOMPOC, CALIFORNIA, ASSIGNOR TO CELITE PRODUCTS COMPANY, OF LOS ANGELES, CALIFORNIA, A CORPORATION OF CALIFORNIA.

PROCESS OF MAKING A PLASTER COMPOSITION.

1,249,997.　　　　　Specification of Letters Patent.　　Patented Dec. 11, 1917.

No Drawing.　　Application filed March 3, 1917.　Serial No. 152,292.

*To all whom it may concern:*

Be it known that I, HANS M. OLSON, a citizen of the United States, residing at Lompoc, in the county of Santa Barbara and State of California, have invented a new and useful Process of Making a Plaster Composition, of which the following is a specification.

This invention relates to the manufacture of a plaster composition consisting of hydrated lime and a non crystalline silica, such as kieselguhr. The main object of the invention is to produce such a composition in a manner to make a superior article of plaster, particularly as to smoothness, plasticity and spreading power thereof.

My invention consists essentially in mixing quick lime with kieselguhr or other non-crystalline silica, having colloidal properties, and then treating the mixture with water or steam in such manner as to convert the quick lime into hydrated lime, while in the presence of the non-crystalline silica, so that a substantially dry powder is obtained, in which the lime is hydrated but still retains the capacity of further reaction on addition of water to form mortar or plaster.

According to my invention, the quicklime may be mixed with the kieselguhr or other non-crystalline silica, either in an ordinary mixing machine, without intergrinding, or, if desired, the quicklime may be interground with non-crystalline silica. Water, either in liquid form or in the form of steam is then added or admitted to the mixture so as to convert the lime to the form of hydrated lime (calcium hydrate) care being taken to avoid an excess of moisture beyond what is usually employed in slaking lime to form hydrated lime. The resulting substantially dry powder may then be used in place of ordinary hydrated lime, and may be stored or transported in the same manner as hydrated lime for any desired time, before being used.

While I prefer to use kieselguhr as the non-crystalline silica constituent of the plaster composition, other non-crystalline silica may be used in some cases, for example, tufa, hydrous silica rock, or opaline silica. Kieselguhr is however, especially suitable for the purpose, not only on account of the lightness it imparts to the plaster, but also on account of the extreme plasticity of the plaster made with the composition. When the composition, made as above described, is mixed with water and sand in the usual manner, to make wall plaster, for example, the resulting mortar has a spreading capacity, or plasticity, which makes it far superior to the ordinary lime mortar plaster, and I have found that the product is improved in this and other respects by hydrating the lime after it is mixed with the kieselguhr.

What I claim is:

1. The process of making a plaster composition which consists in intergrinding finely divided non-crystalline silica with finely divided lime and then hydrating the lime to form a substantially dry powder.

2. The process of making a plaster composition which consists in making a mixture of finely divided kieselguhr with finely divided lime and then adding sufficient water to hydrate the lime without causing the mixture to lose its powdery condition.

In testimony whereof I have hereunto set my hand, at Lompoc, Santa Barbara county, California, this 14th day of February 1917.

HANS M. OLSON.